(12) United States Patent
Kawakami

(10) Patent No.: US 7,683,966 B2
(45) Date of Patent: Mar. 23, 2010

(54) DIGITAL CAMERA HAVING AN ELECTRONIC FLASH DEVICE USING LED AS A FLASH LIGHT SOURCE

(75) Inventor: Chikuni Kawakami, Asaka (JP)

(73) Assignee: Fujifilm Corporation, Tokyo (JP)

( * ) Notice: Subject to any disclaimer, the term of this patent is extended or adjusted under 35 U.S.C. 154(b) by 322 days.

(21) Appl. No.: 11/790,032

(22) Filed: Apr. 23, 2007

(65) Prior Publication Data

US 2007/0195193 A1    Aug. 23, 2007

Related U.S. Application Data

(62) Division of application No. 10/759,424, filed on Jan. 20, 2004.

(30) Foreign Application Priority Data

Jan. 21, 2003    (JP)    ............................. 2003-011750

(51) Int. Cl.
    *H04N 5/222*    (2006.01)
(52) U.S. Cl. ...................................................... 348/371
(58) Field of Classification Search .................. 348/371
    See application file for complete search history.

(56) References Cited

U.S. PATENT DOCUMENTS

| | | | | |
|---|---|---|---|---|
| 4,897,639 A | * | 1/1990 | Kanayama | .................... 345/82 |
| 5,808,681 A | * | 9/1998 | Kitajima | ..................... 348/371 |
| 5,815,204 A | * | 9/1998 | Abe et al. | .................... 348/371 |
| 5,937,221 A | * | 8/1999 | Yamamoto et al. | .......... 396/429 |
| 6,041,192 A | * | 3/2000 | Yamamoto | .................... 396/315 |
| 6,693,673 B1 | * | 2/2004 | Tanaka et al. | ................ 348/371 |
| 6,963,362 B1 | * | 11/2005 | Nakayama | ............... 348/224.1 |
| 7,167,202 B2 | * | 1/2007 | Ojima | .......................... 348/348 |
| 2002/0025157 A1 | * | 2/2002 | Kawakami | .................... 396/155 |

FOREIGN PATENT DOCUMENTS

| | | |
|---|---|---|
| JP | 8-140104 | 5/1996 |
| JP | 11-133476 | 5/1999 |
| JP | 2000-111983 A | 4/2000 |
| JP | 2000-224608 | 8/2000 |
| JP | 2002-116481 A | 4/2002 |
| JP | 2002-357859 A | 12/2002 |

* cited by examiner

*Primary Examiner*—Tuan Ho
*Assistant Examiner*—Kent Wang
(74) *Attorney, Agent, or Firm*—Birch, Stewart, Kolasch & Birch, LLP

(57) ABSTRACT

In a digital camera including an electronic flash device using a light-emitting diode as a flash light source, white balance correction is performed by using a white balance correction value corresponding to a color temperature of light actually emitted from the electronic flash device.

3 Claims, 7 Drawing Sheets

DIGITAL CAMERA HAVING AN ELECTRONIC FLASH DEVICE USING LED AS A FLASH LIGHT SOURCE

This application is a Divisional of co-pending application Ser. No. 10/759,424 filed on Jan. 20, 2004, and for which priority is claimed under 35 U.S.C. § 120; and this application claims priority of Application No. 2003-011750 filed in Japan on Jan. 21, 2003 under 35 U.S.C. § 119; the entire contents of all are hereby incorporated by reference.

BACKGROUND OF THE INVENTION

1. Field of the Invention

The present invention relates to a digital camera and particularly relates to a digital camera comprising an electronic flash device using a light-emitting diode (LED) as a flash light source.

2. Description of the Related Art

In general, a xenon tube is used as a light source in an electronic flash device of a camera. However, an electronic flash device using a xenon tube as a light source can emit only instant light of several milliseconds, so that flash shooting cannot be performed while a shutter is released slowly. Further, since a xenon tube has a spectral characteristic close to a daylight color, flash shooting for backlight correction in the morning and evening results in a picture with an unnatural color. Hence, in order to solve the defect of such an electronic flash device using a xenon tube as a light source, an electronic flash device using an LED as a light source is proposed (e.g., Japanese Patent Application Publication No. 2002-116481).

However, since an LED emits light varied in color temperature among products, when an LED is used as a flash light source of a digital camera, a white balance correction result is varied among products.

Moreover, an LED emits light varied in color temperature according to an ambient temperature and an applied current, and a white balance correction result is varied according to an ambient temperature and an applied current.

The present invention is devised in view of such circumstances and has as its objective the provision of a digital camera achieving an image of a stable color shade during flash shooting using an LED as a flash light source.

SUMMARY OF THE INVENTION

In order to attain the above objective, first aspect of a present invention provides a digital camera having an electronic flash device using a light-emitting diode as a flash light source, comprising: a storage device which stores correction information for correcting white balance of an image obtained by flash shooting using the electronic flash device, the storage device storing the correction information set based on a detection result of a color temperature of light actually emitted from the electronic flash device; and a white balance correcting device which corrects white balance of the image obtained by flash shooting using the electronic flash device based on the correction information stored in the storage device.

According to the first aspect, the white balance correction information is set based on a detection result of a color temperature of light actually emitted from the electronic flash device, and the white balance of the image obtained by flash shooting is corrected based on the set correction information. Hence, even when light emitted from the electronic flash device is varied in color temperature among products, it is possible to obtain images of the same color shade.

Further, in order to attain the above object, second aspect of a present invention provides a digital camera having an electronic flash device using a light-emitting diode as a flash light source, comprising: a storage device which stores correction information for correcting white balance of an image obtained by flash shooting, a white balance correcting device which corrects white balance of the image obtained by flash shooting based on the correction information stored in the storage device, a modification information storage device which stores modification information for correcting the correction information stored in the storage device, the modification information storage device storing the modification information required to make the correction information stored in the storage device coincident with correction information set based on a detection result of a color temperature of light actually emitted from the electronic flash device, a modifying device which modifies the correction information based on the modification information stored in the modification information storage device; and the white balance correcting device corrects the white balance of the image obtained by flash shooting based on the correction information modified by the modifying device.

According to the second aspect of the present invention, the white balance correction information stored in the storage device is modified so as to coincide with the white balance correction information set based on a detection result of a color temperature of light actually emitted from the electronic flash device, and the white balance of the image obtained by flash shooting is corrected based on the modified correction information. Hence, even when light emitted from the electronic flash device is varied in color temperature among products, it is possible to obtain images of the same color shade.

Moreover, in order to attain the above object, third aspect of a present invention provides a digital camera having an electronic flash device using a light-emitting diode as a flash light source, comprising: a storage device which stores correction information for correcting white balance of an image obtained by flash shooting, a white balance correcting device which corrects white balance of the image obtained by flash shooting based on the correction information stored in the storage device, a temperature detecting device which detects an ambient temperature of the light-emitting diode, a modification information storage device which stores modification information for modifying the correction information stored in the storage device, the modification information storage device storing the modification information of the correction information based on a change in an ambient temperature of the light-emitting diode, a modifying device which modifies the correction information stored in the storage device based on a detection result of the temperature detecting device and the modification information stored in the modification information storage device; and the white balance correcting device corrects white balance of the image obtained by flash shooting based on the correction information modified by the modifying device.

According to the third aspect of the present invention, the white balance correction information stored in the storage device is modified according to a change in the ambient temperature of the light-emitting diode, and the white balance of the image obtained by flash shooting is corrected based on the modified correction information. Hence, even when the light-emitting diode changes in ambient temperature and light emitted from the electronic flash device changes in color temperature, it is always possible to obtain images of the same color shade.

In order to attain the above objective, fourth aspect of a present invention provides a digital camera having an electronic flash device using a light-emitting diode as a flash light source, comprising: a storage device which stores correction information for correcting white balance of an image obtained by flash shooting, a white balance correcting device which corrects white balance of an image obtained by flash shooting based on the correction information stored in the storage device, a current detecting device which detects a value of current applied to the light-emitting diode, a modification information storage device which stores modification information for the correction information based on a change in a value of current applied to the light-emitting diode, the modification information storage device storing the modification information for modifying the correction information stored in the storage device, a modifying device which modifies the correction information stored in the storage device based on a detection result of the current detecting device and the modification information stored in the modification information storage device; and the white balance correcting device corrects the white balance of the image obtained by flash shooting, based on the correction information modified by the modifying device.

According to the fourth aspect of the present invention, the white balance correction information stored in the storage device is modified according to a change in current applied to the light-emitting diode, and the white balance of the image obtained by flash shooting is corrected based on the modified correction information. Hence, even when current applied to the light-emitting diode changes and light emitted from the electronic flash device changes in color temperature, it is always possible to obtain images of the same color shade.

As described above, according to the present invention, white balance correction is performed based on a color temperature of light actually emitted from an electronic flash device. Thus, even when an LED is used as a flash light source, it is always possible to obtain an image of a stable color shade.

Further, since white balance correction is performed according to a change in ambient temperature or a change in current applied to the LED, it is always possible to obtain an image of a stable color shade.

DETAILED DESCRIPTION OF THE PREFERRED EMBODIMENTS

The preferred embodiments of a digital camera according to the present invention will be described below in accordance with the accompanying drawings.

Figure 1:
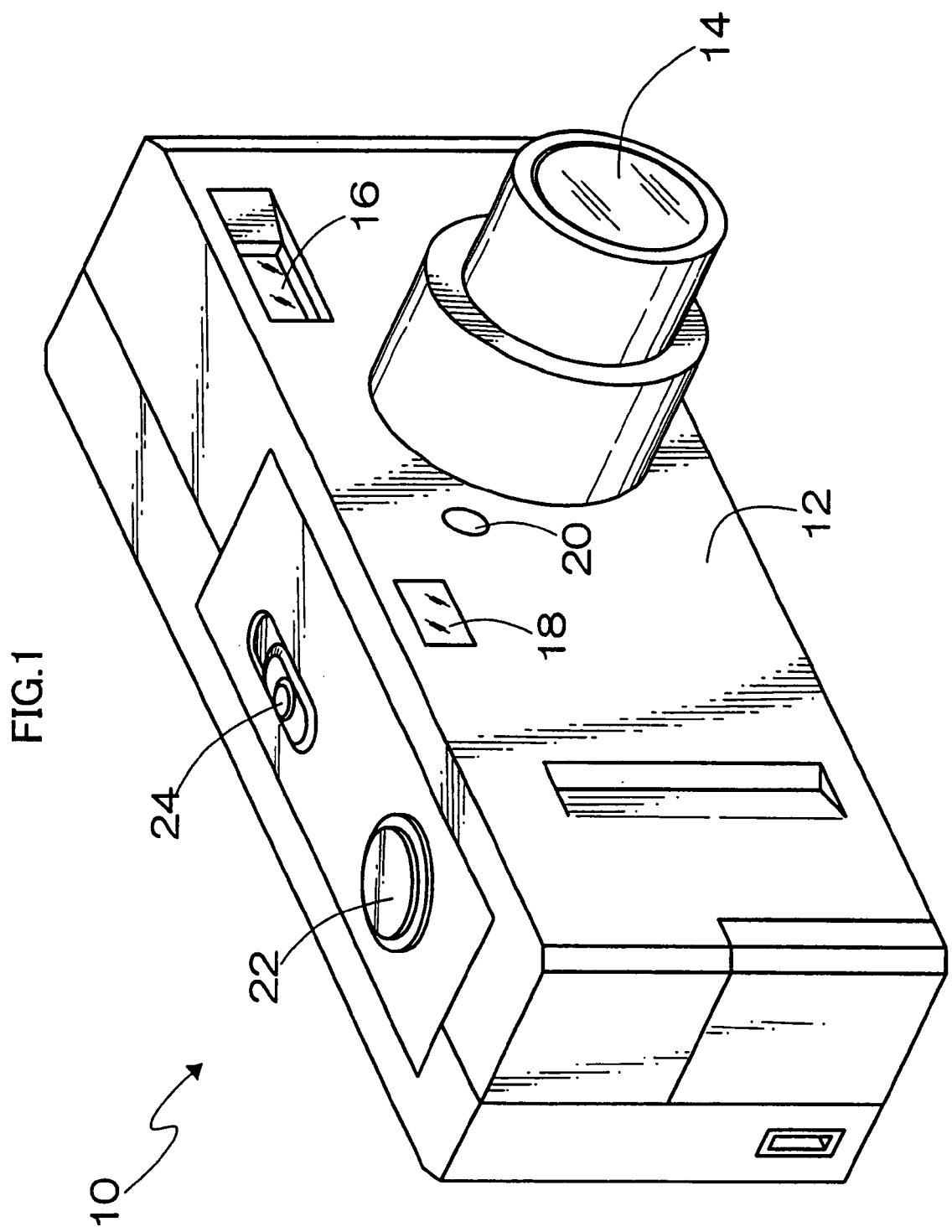
FIG. 1 is a front perspective view showing one embodiment of a digital camera according to the present invention.

FIG. 1 is a front perspective view showing an embodiment of a digital camera 10 according to the present invention. As shown in FIG. 1, the front of a camera body 12 comprises a taking lens 14, a finder window 16, an electronic flash device 18, a flash light control window 20, and so on. The top surface comprises a release button 22, a power supply switch 24, and so on. Further, the back (not shown) of the camera body 12 comprises a finder eyepiece, a liquid crystal monitor, various operation buttons (e.g., a zoom key, a mode button, a menu button, a cross button) and so on.

Figure 2:
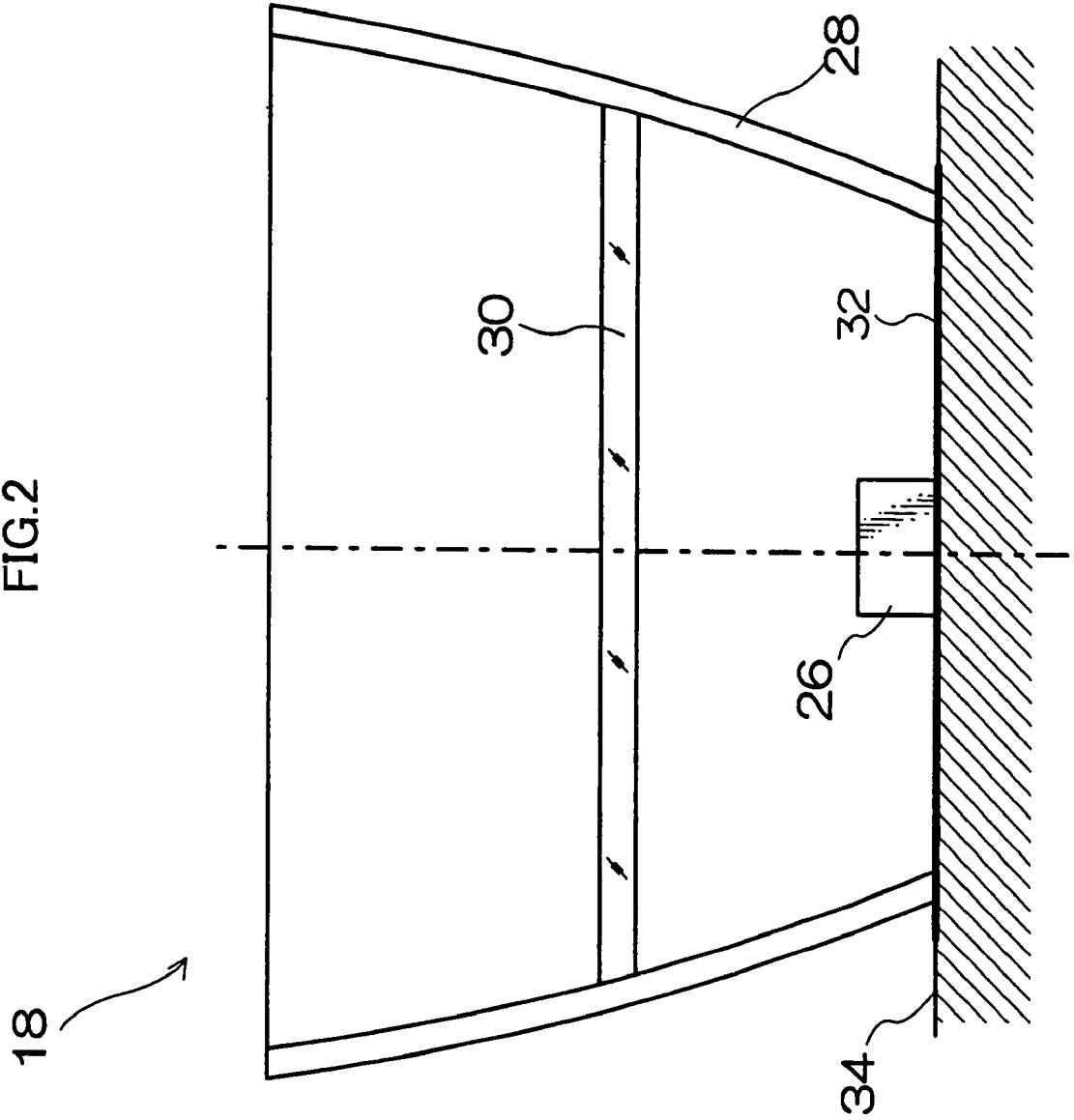
FIG. 2 is a sectional view showing the configuration of a light-emitting part of an electronic flash device.

FIG. 2 is a sectional view showing the configuration of a light-emitting part of the electronic flash device 18 which is mounted in the digital camera 10 shown in FIG. 1. As shown in FIG. 2, the light-emitting part of the electronic flash device 18 is constituted of a light-emitting diode (LED) 26 serving as a light source, a reflector 28 for reflecting forward light emitted from the LED 26, and a diffuser panel 30 for diffusing light emitted from the LED 26.

The LED 26 is mounted on a circuit board 32 and emits white light with high intensity. The reflector 28 is attached to the circuit board 32 so as to surround the LED 26. Further, the diffuser panel 30 is integrally attached into the reflector 28 and diffuses light emitted with high directivity from the LED 26.

Figure 3:
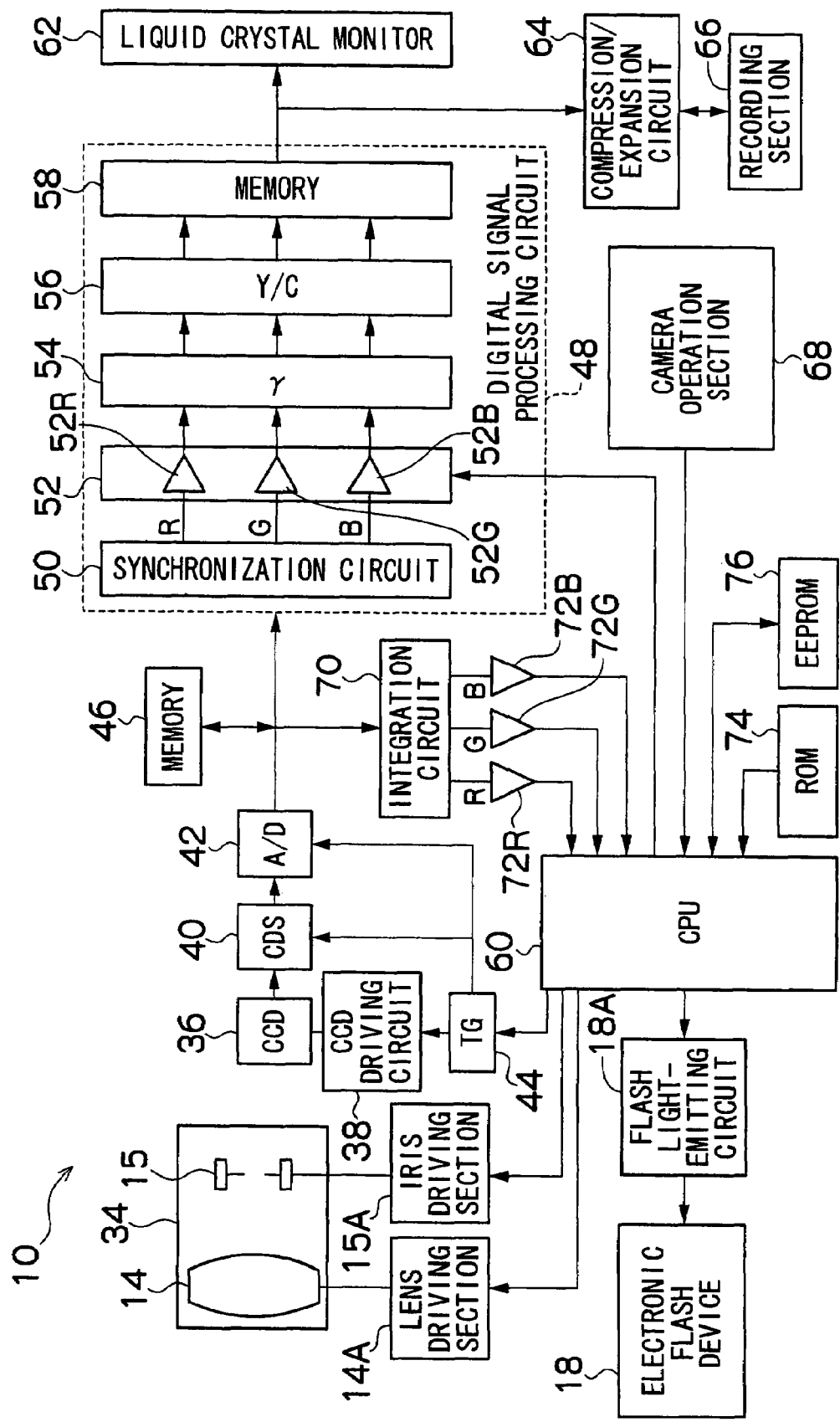
FIG. 3 is a block diagram showing the internal configuration of the digital camera.

FIG. 3 is a block diagram showing the internal configuration of the digital camera 10. As shown in FIG. 3, behind a lens unit 34 including the taking lens 14 and an iris 15, a solid-state image sensing device (CCD) 36 is disposed. On a light-receiving surface of the CCD 36, a number of photosensors are arranged two-dimensionally. A subject image formed on the light-receiving surface of the CCD 36 via the taking lens 14 and the iris 15 is converted to signal charge corresponding to an incident light quantity by the photosensors. Then, the signal charge accumulated in the photosensors is read into a shift register by a read gate pulse applied from a CCD driving circuit 38, and the signal charge is sequentially read by a register transfer pulse as a voltage signal corresponding to the signal charge.

Besides, the CCD 36 can sweep the accumulated signal charge by using a shutter gate pulse, so that time for accumulating charge (shutter speed) can be controlled (so-called electronic shutter function).

Voltage signals sequentially read from the CCD 36 are applied to a correlated double sampling circuit (CDS circuit) 40. R, G, and B signals of each pixel are subjected to sampling hold therein and are applied to an AD converter 42. The AD converter 42 converts analog R, G, and B signals, which are sequentially applied from the CDS circuit 40, to digital R, G, and B signals and outputs the signals therefrom.

Moreover, the CCD driving circuit 38, the CDS circuit 40, and the AD converter 42 are driven in synchronization with one another by a timing signal applied from a timing generation circuit (TG) 44.

The digital R, G, and B signals outputted from the AD converter 42 are temporarily stored in a memory 46 and are applied to a digital signal processing circuit 48.

The digital signal processing circuit 48 is constituted of a synchronization circuit 50, a white balance correction circuit 52, a gamma-correction circuit 54, a YC signal generation circuit 56, a memory 58, and so on.

The synchronization circuit 50 sequentially synchronizes the R, G, and B signals of each pixel which are read from the memory 46, and outputs the R, G, and B signals simultaneously to the white balance correction circuit 52.

The white balance correction circuit 52 comprises multipliers 52R, 52G, and 52B for increasing or reducing the digital values of the R, G, and B signals, respectively. The R, G, and B signals inputted from the synchronization circuit 50 are applied to the multipliers 52R, 52G, and 52B, respectively. Further, a white balance correction value (gain value) W ($W_R$, $W_G$, $W_B$) for white balance control is applied from a central processing unit (CPU) 60 to the other inputs of the multipliers 52R, 52G, and 52B. The multipliers 52R, 52G, and 52B each perform a multiplication on two inputs and output R', G', and B' signals, which have been subjected to white balance correction by multiplication, to the gamma-correction circuit 54.

The detail will be discussed later regarding the white balance correction value W applied from the CPU 60 to the white balance correction circuit 52.

The gamma-correction circuit 54 changes input/output characteristics so that the R', G', and B' signals having been subjected to white balance correction have desired gamma characteristics, and the gamma-correction circuit 54 outputs the signals to the YC signal generation circuit 56.

The YC signal generation circuit 56 generates a luminance signal Y and chroma signals Cr and Cb from the R, G, and B signals having been subjected to gamma correction. The luminance signal Y and chroma signals Cr and Cb (YC signals) are stored in the memory 58 having the same memory space as the memory 46.

Here, the YC signal in the memory 58 is read and outputted to a liquid crystal monitor 62, so that a through image, a taken static image, and so on can be displayed on the liquid crystal monitor 62 which is provided on the back of the camera body 12.

Further, the YC signal after shooting is compressed in a predetermined format by a compression/expansion circuit 64 and is recorded in a recording medium such as a memory card by a recording section 66.

Further, in a reproduction mode, image data recorded in a memory card and so on is expanded by the compression/expansion circuit 64 and is outputted to the liquid crystal monitor 62, so that a reproduced image is displayed on the liquid crystal monitor 62.

The CPU 60 exercises control over circuits based on an input from a camera operation section 68 including the release button 22, the power supply switch 24, and so on, and the CPU 60 performs autofocus control, automatic exposure control, white balance control, and so on.

For example, autofocus control is performed by a contrast AF system in which the movement of the taking lens 14 is controlled so that a G signal in a specific focus area has the maximum high-frequency component. The CPU 60 controls the movement of the taking lens 14 via a lens driving section 14A so that a G signal in a specific focus area has the maximum high-frequency component.

Automatic exposure control is performed by calculating a luminance of a subject (shooting EV value) based on an integrated value of the R, G, and B signals and controlling an aperture and a shutter speed based on the calculated shooting EV value. The CPU 60 determines an aperture value and a shutter speed based on the shooting EV value, controls the iris 15 via an iris driving section 15A so as to have the determined aperture value, and controls a charge accumulation time via the CCD driving circuit 38 so as to have the determined shutter speed.

Moreover, the CPU 60 decides whether or not flash shooting is necessary based on the shooting EV value. When flash shooting is necessary, flash light is emitted from the electronic flash device 18 via a flash light-emitting circuit 18A.

White balance control is performed by determining a light source type (color temperature of a field), determining a white balance correction value W ($W_R$, $W_G$, $W_B$) suitable for the determined light source type, and outputting the determined white balance correction value W to the multipliers 52R, 52G, and 52B of the white balance correction circuit 52 (upon normal shooting).

A light source type (color temperature of a field) is determined as follows: first whole screen is divided into a plurality of areas (e.g., 8*8) based on the R, G, and B signals temporarily stored in the memory 46, and an average integrated value for each color of the R, G, and B signals is calculated in each of the divided areas. The average integrated value of the R, G, and B signals for each of the divided areas is calculated by an integration circuit 70 and is applied to the CPU 60. Multipliers 72R, 72G, and 72B are provided between the integration circuit 70 and the CPU 60, and an adjusted gain value for adjusting a variation between devices is applied to the multipliers 72R, 72G, and 72B. The CPU 60 discriminates a light source type such as day light (fine whether), shade-cloudy, a fluorescent light, and a tungsten lamp based on the average integrated value of the R, G, and B signals for each of the divided areas. The average integrated value has been applied from the integration circuit 70 via the multipliers 72R, 72G, and 72B.

In the discrimination of the light source type, ratios R/G and B/G are calculated for each of the divided areas regarding an average integrated value for each color of the R, G, and B signals. Subsequently, the detection frames, each of them indicates a range of color distribution corresponding to a specific light source type, are set on a graph where a horizontal axis represents R/G and a vertical axis represents B/G. Then, the number of areas existing in each detection frame is calculated based on the ratios R/G and B/G for each obtained area, and the light source type is discriminated based on the luminance level of a subject and the number of the areas existing in each detection frame (Japanese Patent Application Publication No. 2000-224608).

Besides, the method of automatically determining a light source type (color temperature of a field) based on the R, G, and B signals obtained from the CCD 36 is not limited to the present embodiment.

When the light source type (color temperature of a field) is determined thus, the CPU 60 determines a white balance correction value W ($W_R$, $W_G$, $W_B$) suitable for the light source type and outputs the determined white balance correction value W to the multipliers 52R, 52G, and 52B of the white balance correction circuit 52. Thus, the R', G', and B' signals having been subjected to white balance correction are outputted to the gamma-correction circuit 54 from the multipliers 52R, 52G, and 52B.

The white balance correction value W ($W_R$, $W_G$, $W_B$) is determined by making reference to a table recorded in a ROM 74. The table records the white balance correction value W corresponding to each light source type (color temperature of a field). When a light source type (color temperature of a field) is determined, the white balance correction value W corresponding to the light source type is uniquely determined. The ROM 74 records an operation program of a camera and various kinds of data in addition to the table indicating a relationship between the light source type and the white balance correction value.

As described above, in normal shooting not using the electronic flash device 18, a light source type is determined upon shooting, a white balance correction value W ($W_R$, $W_G$, $W_B$) suitable for the determined light source type is determined based on a table, and the determined white balance correction value W is outputted to the multipliers 52R, 52G, and 52B of the white balance correction circuit 52 to perform white balance correction.

On the other hand, in the case of flash shooting using the electronic flash device 18, a light source type is not determined but a white balance correction value $W_O$ ($W_{OR}$, $W_{OG}$, $W_{OB}$) corresponding to a color temperature of flash light is used to perform white balance correction. That is, in the case of flash shooting, the CPU 60 reads the white balance correction value (white balance correction value suitable for a color temperature of flash light) $W_O$ ($W_{OR}$, $W_{OG}$, $W_{OB}$) for flash shooting from the ROM 74 and the CPU 60 outputs the white balance correction value $W_O$ to the multipliers 52R, 52G, and 52B of the white balance correction circuit 52.

In this case, the ROM 74 records, as a white balance correction value for flash shooting, a white balance correction value $W_O$ ($W_{OR}$, $W_{OG}$, $W_{OB}$) for emitting flash light of a reference color temperature $T_O$. Therefore, by emitting flash light having the same color temperature from the electronic flash device 18 as the reference color temperature $T_O$ and performing shooting, an image is obtained with fine color balance.

However, the LED serving as a light source of the electronic flash device 18 emits light varied in color temperature among elements and thus the LED does not always emit light having the same color temperature as the reference color temperature.

Thus, in the digital camera of the present embodiment, a color temperature $T_1$ of light actually emitted from the electronic flash device 18 is measured and a white balance correction value $W_1$ ($W_{1R}$, $W_{1G}$, $W_{1B}$) suitable for the color temperature $T_1$ is used to perform white balance correction upon flash shooting. To be specific, white balance correction upon flash shooting is performed as below.

First, a color temperature $T_1$ of light actually emitted from the electronic flash device 18 is measured. Then, a white balance correction value $W_1$ ($W_{1R}$, $W_{1G}$, $W_{1B}$) suitable for the color temperature $T_1$ is calculated. A difference $\Delta W$ ($\Delta W = W_O - W_1$) between the determined actual white balance correction value $W_1$ ($W_{1R}$, $W_{1G}$, $W_{1B}$) and the reference white balance correction value $W_O$ ($W_{OR}$, $W_{OG}$, $W_{OB}$) recorded in the ROM 74 is calculated, and the difference $\Delta W$ is recorded as a modification value in an EEPROM 76. That is, a modification value $\Delta W$ ($\Delta W_R$, $\Delta W_G$, $\Delta W_B$) is calculated for correcting the reference white balance correction value $W_O$, which is recorded in the ROM 74, to the white balance correction value $W_1$ ($W_{1R}$, $W_{1G}$, $W_{1B}$) suitable for the color temperature $T_1$ of flash light actually emitted from the electronic flash device 18, and the correction value $\Delta W$ is recorded in the EEPROM 76 ($\Delta W_R = W_{OR} - W_{1R}$, $\Delta W_G = W_{OG} - W_{1G}$, $\Delta W_B = W_{OB} - W_{1B}$).

The CPU 60 reads the reference white balance correction value $W_O$ ($W_{OR}$, $W_{OG}$, $W_{OB}$) for flash shooting from the ROM 74 and reads the modification value $\Delta W$ ($\Delta W_R$, $\Delta W_G$, $\Delta W_B$) from the EEPROM 76 upon flash shooting. Then, the reference white balance correction value $W_O$ ($W_{OR}$, $W_{OG}$, $W_{OB}$) is corrected to the white balance correction value $W_1$ ($W_{1R}$, $W_{1G}$, $W_{1B}$) suitable for the color temperature $T_1$ of actual flash light by using the modification value $\Delta W$ ($\Delta W_R$, $\Delta W_G$, $\Delta W_B$), and the corrected value is outputted to the multipliers 52R, 52G, and 52B of the white balance correction circuit 52.

Hence, even when the LED emitting light varied in color temperature is used as a flash light source, each product of camera can obtain an image of the same color shade without being varied in color balance.

Besides, a color temperature $T_1$ of actual flash light is measured by a color temperature measuring device after the digital camera 10 is manufactured. That is, flash light is actually emitted from the electronic flash device 18 and the color temperature of the light is measured by the color temperature measuring device. Then, a white balance correction value $W_1$ suitable for the measured color temperature $T_1$ of the light is calculated, a difference $\Delta W$ is calculated from the reference white balance correction value $W_O$ for flash shooting that is recorded in the ROM 74, and a modification value is obtained.

The obtained modification value $\Delta W$ is written in the EEPROM 76 by using a communicating function (e.g., USB, IEEE 1394, etc.) provided in the digital camera 10. That is, for example, the digital camera 10 and a personal computer are connected to each other via a USB cable, the data of the modification value is transmitted from the personal computer to the digital camera, and the transmitted data of the modification value is written in the EEPROM 76.

Further, the data of the modification value may be obtained by using a recording medium for recording images. That is, the following process may be applicable: the recording medium having recorded the data of the modification value is loaded into the digital camera 10, the data of the modification value is acquired from the recording medium, and the data is written in the EEPROM 76.

Moreover, the recording device for recording the data of the modification value is not limited to the EEPROM and thus another recording device may be used.

The following will describe Embodiment 2 of a digital camera according to the present invention. The basic configuration of the device is the same as the digital camera of Embodiment 1 and thus the explanation thereof is omitted.

In the digital camera of Embodiment 1, the white balance correction value $W_1$ suitable for the color temperature of actual flash light is obtained by correcting the white balance correction value $W_O$, which is recorded in the ROM 74, by using the modification value $\Delta W$ recorded in the EEPROM 76.

In a digital camera 10 of the present embodiment, a white balance correction value $W_1$ suitable for the color temperature of actual flash light is recorded in an EEPROM 76, and the white balance correction value $W_1$ recorded in the EEPROM 76 is used to perform white balance correction.

In a method of recording the white balance correction value $W_1$ in the EEPROM 76, recording is performed by using a communicating function and a recording medium that are provided in the digital camera, just like the digital camera 10 of Embodiment 1.

In the digital camera of the present embodiment, a CPU 60 reads a white balance correction value $W_1$ ($W_{1R}$, $W_{1G}$, $W_{1B}$) from the EEPROM 76 and outputs the value to multipliers 52R, 52G, and 52B of a white balance correction circuit 52 to perform white balance correction.

Thus, even when an LED emitting light varied in color temperature is used as a flash light source just like the digital camera of Embodiment 1, each product of camera can obtain an image of the same color shade without being varied in color balance.

Additionally, the table of a white balance correction value of normal shooting may be recorded in the EEPROM 76 along with a white balance correction value of flash shooting.

Figure 4:
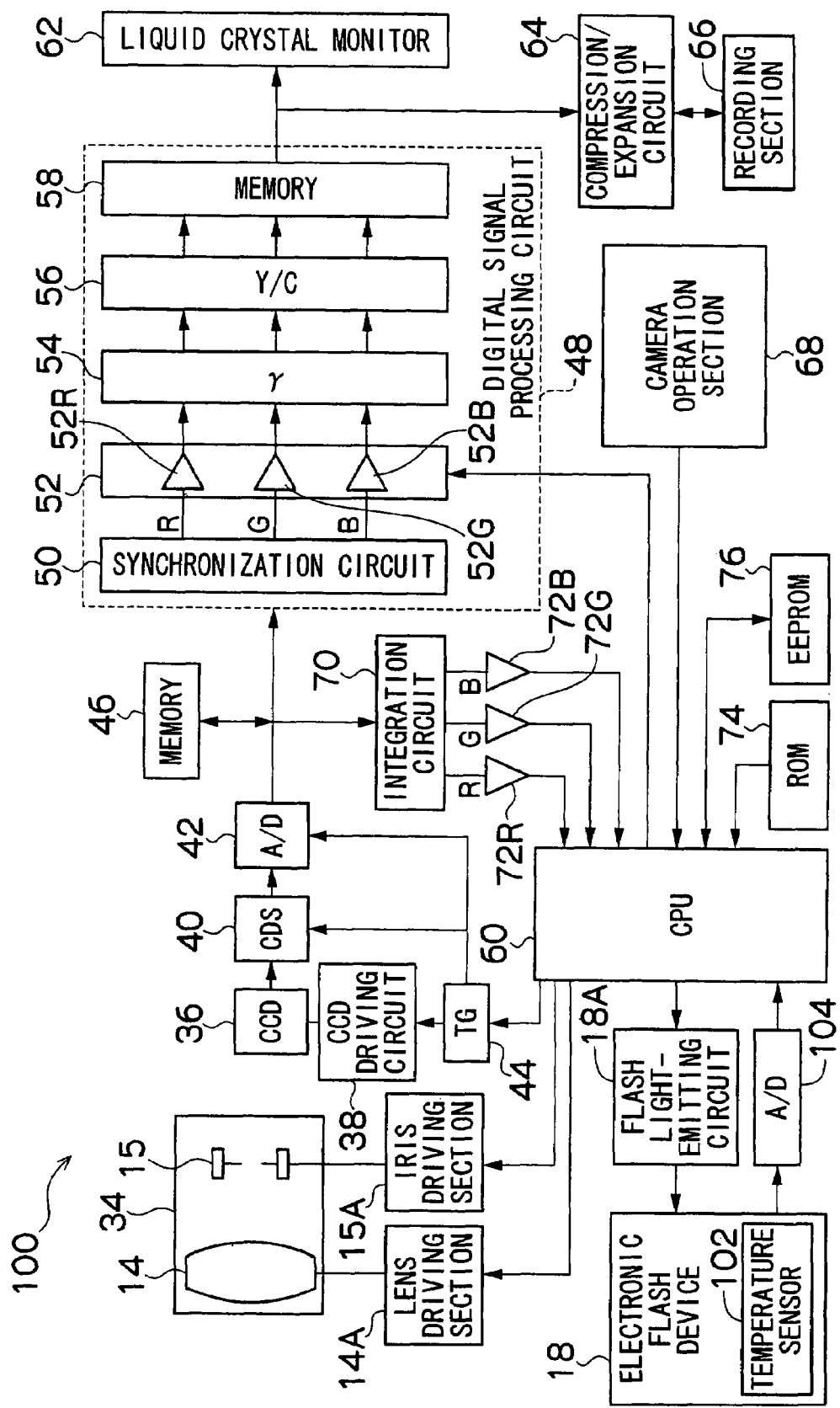
FIG. 4 is a block diagram showing the internal configuration of a digital camera according to Embodiment 3.

FIG. 4 is a block diagram showing the internal configuration of Embodiment 3 according to a digital camera of the present invention.

As shown in FIG. 4, a digital camera 100 of the present embodiment is different from the digital camera 10 of Embodiment 1 in that an electronic flash device 18 comprises a temperature sensor 102 for detecting an ambient temperature of an LED serving as a flash light source. Since the other configurations are the same as the digital camera 10 of Embodiment 1, the same components as the digital camera 10 of Embodiment 1 are indicated by the same reference numerals and thus explanation thereof is omitted.

Figure 5:
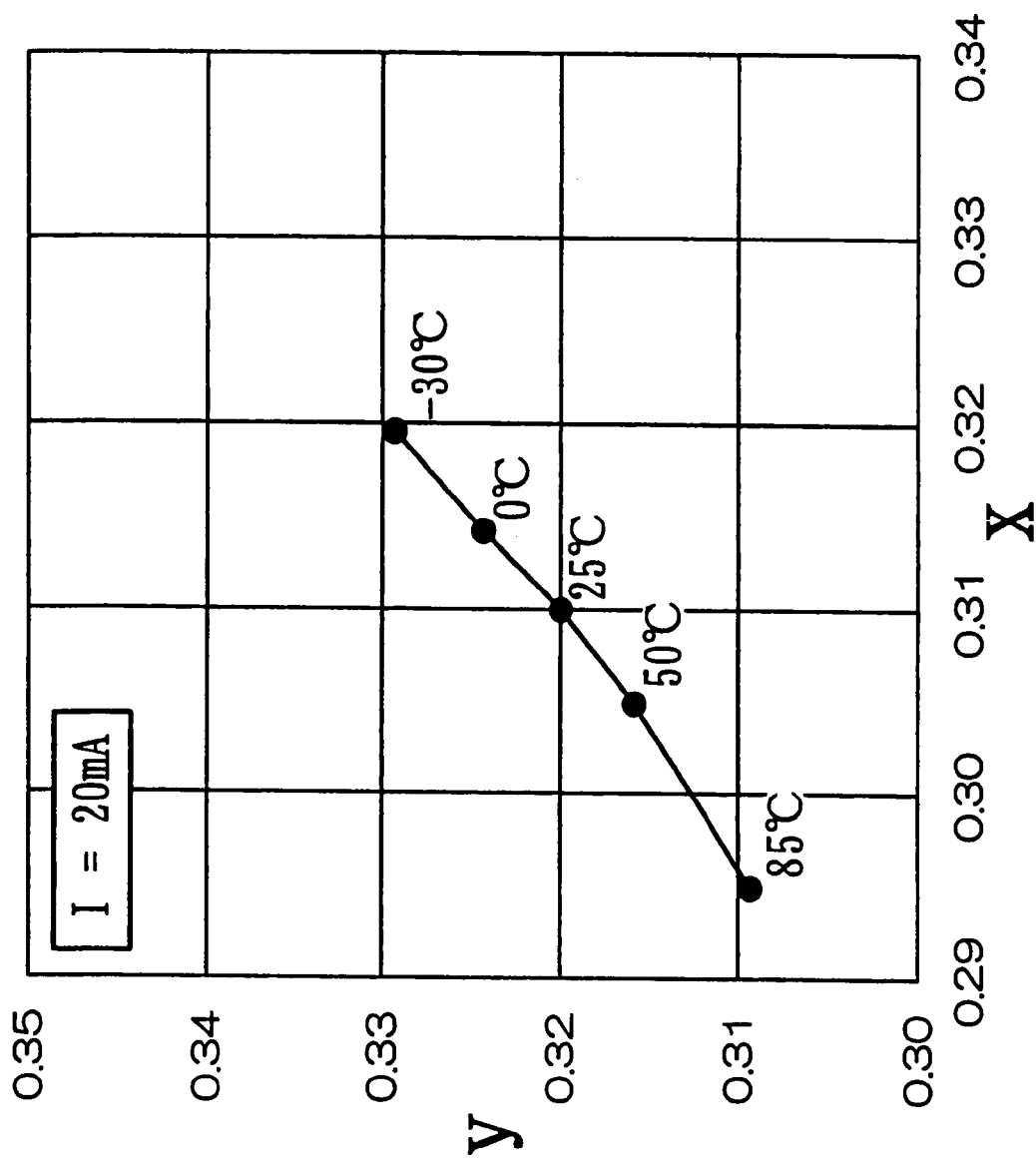
FIG. 5 is an xy chromaticity diagram showing a change in color temperature relative to a change in ambient temperature T of an LED.

The LED serving as a flash light source emits light varied in color temperature according to a change in ambient temperature. FIG. 5 is an xy chromaticity diagram showing a change in color temperature relative to a change in an ambient temperature T of the LED (current (forward current) applied to the LED is 20 mA). As shown in FIG. 5, when the ambient temperature of the LED changes from a high temperature to a low temperature, the color temperature of light emitted by the LED changes accordingly from a high temperature to a low temperature.

Therefore, when white balance correction is performed by using a constant white balance correction value on image data obtained by flash shooting, an ambient temperature change of the LED may result in images of different color shades.

Hence, in the digital camera 100 of the present embodiment, a white balance correction value is corrected according to a change in the ambient temperature of the LED.

As shown in FIG. 4, an electronic flash device 18 comprises a temperature sensor 102 for detecting the ambient temperature of the LED serving as a light source. The ambient temperature of the LED that is detected by the temperature sensor 102 is inputted to the CPU 60 via an AD converter 104.

On the other hand, an EEPROM 76 records a table indicating a correspondence relationship between an ambient temperature T of the LED and a white balance correction value $W_T(W_{TR}, W_{TG}, W_{TB})$. By making reference to the table, the white balance correction value $W_T$ ($W_{TR}$, $W_{TG}$, $W_{TB}$) is uniquely determined according to the ambient temperature T of the LED.

Upon flash shooting, the CPU 60 acquires the ambient temperature T of the LED via the AD converter 104 from the temperature sensor 102 and determines the white balance correction value $W_T$ ($W_{TR}$, $W_{TG}$, $W_{TB}$), which corresponds to the ambient temperature T, based on the table recorded in the EEPROM 76. Then, the CPU 60 outputs the determined white balance correction value $W_T$ ($W_{TR}$, $W_{TG}$, $W_{TB}$) to multipliers 52R, 52G, and 52B of a white balance correction circuit 52 and performs white balance correction on taken image data.

Thus, even when the LED changes in ambient temperature and light emitted from the LED changes in color temperature, it is always possible to obtain an image with stable color balance.

In the present embodiment, the white balance correction value $W_T$ ($W_{TR}$, $W_{TG}$, $W_{TB}$) at each ambient temperature T of the LED is recorded as a table in the EEPROM 76. A ROM 74 may record a reference white balance correction value, for example, a white balance correction value $W_{20}$ ($W_{20R}$, $W_{20G}$, $W_{20B}$) when the LED has an ambient temperature T of 20° C., and the EEPROM 76 may record a modification value $\Delta W_T$ (modification value of the reference white balance correction value $W_{20}$ at each ambient temperature T) as a table at each ambient temperature T of the LED.

In this case, the CPU 60 acquires the modification value $\Delta W_T$ corresponding to the ambient temperature T from the table recorded in the EEPROM 76 and corrects the reference white balance correction value $W_{20}$. Then, the CPU 60 outputs the corrected white balance correction value $W_T$ ($W_{TR}$, $W_{TG}$, $W_{TB}$) to the multipliers 52R, 52G, and 52B of the white balance correction circuit 52 and performs white balance correction.

Further, in the method of recording the white balance correction value in the EEPROM 76, recording is performed using a communicating function and a recording medium that are provided in the digital camera, just like the digital camera 10 of Embodiment 1.

A white balance correction value corresponding to each ambient temperature T may be uniquely set in all products of digital cameras. However, the LED emits light varied in color temperature among elements just like Embodiment 1 and thus it is preferable to perform setting based on the color temperature of light actually emitted from the electronic flash device 18.

Figure 6:
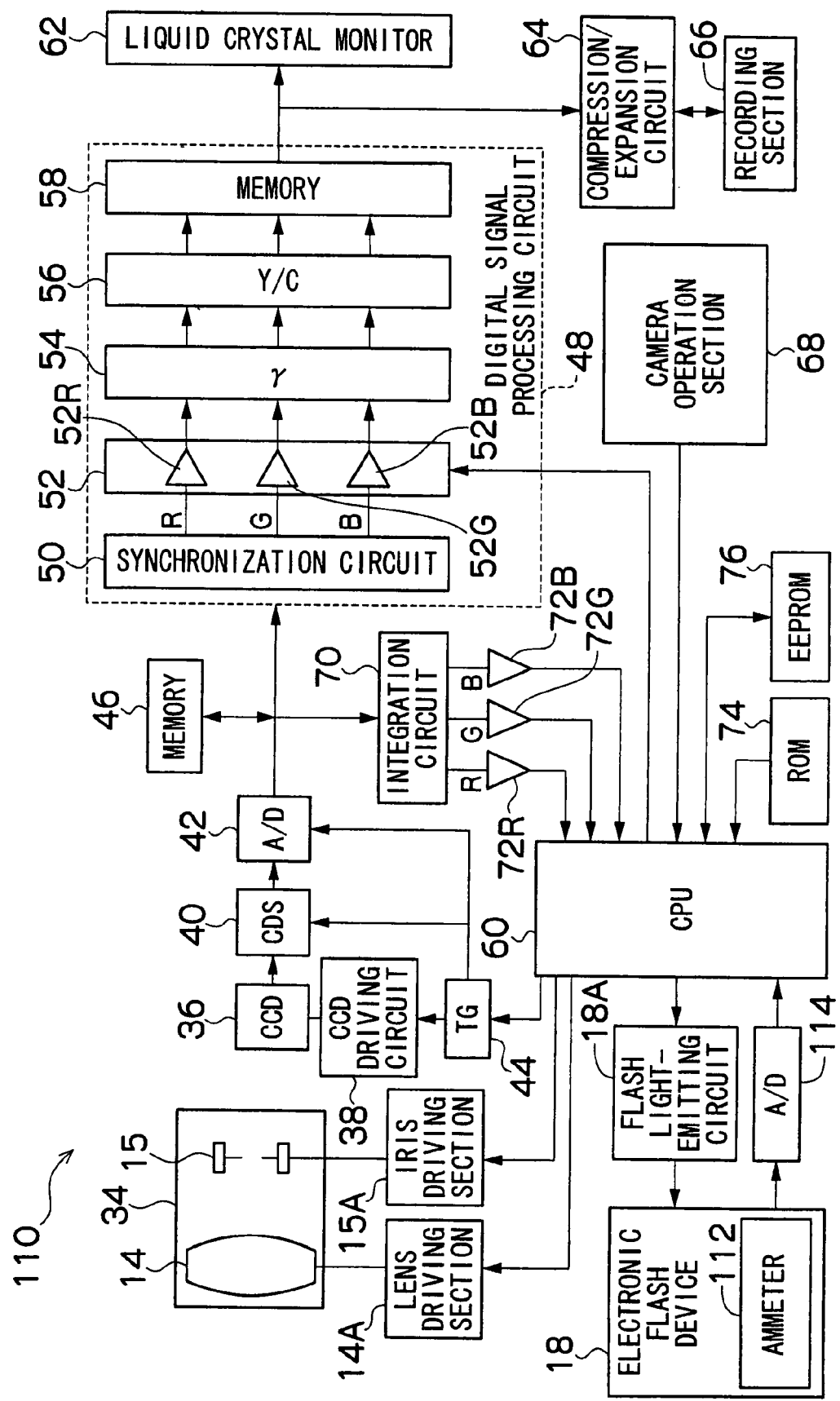
FIG. 6 is a block diagram showing the internal configuration of a digital camera according to Embodiment 4.

FIG. 6 is a block diagram showing the internal configuration of Embodiment 4 according to the digital camera of the present invention.

As shown in FIG. 6, a digital camera 110 of the present embodiment is different from the digital camera 10 of Embodiment 1 in that an electronic flash device 18 comprises an ammeter 112 for measuring current (forward current) applied to an LED. Since the other configurations are the same as the digital camera 10 of Embodiment 1, the same components as the digital camera 10 of Embodiment 1 are indicated by the same reference numerals and the explanation thereof is omitted.

Figure 7:
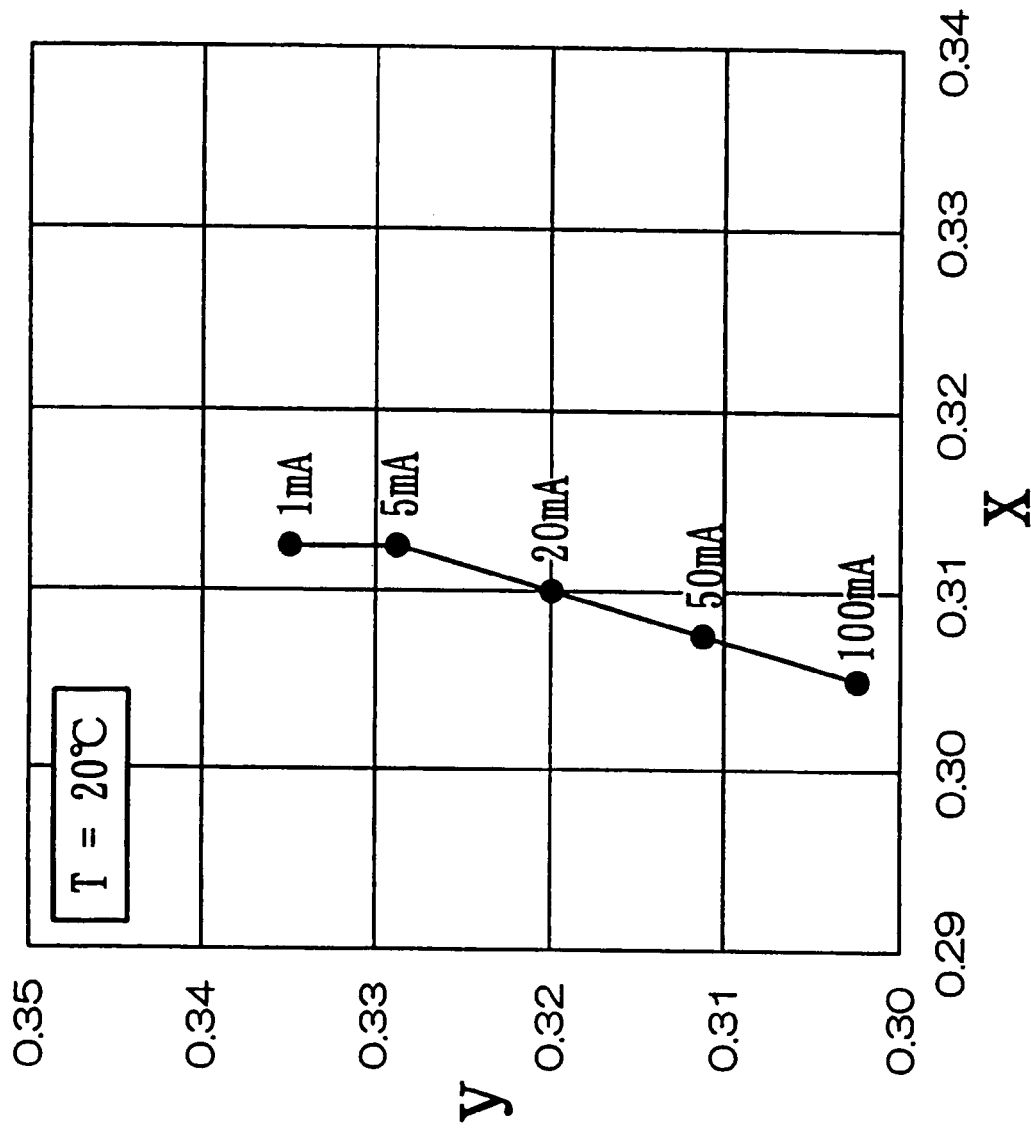
FIG. 7 is an xy chromaticity diagram showing a change in color temperature relative to a change in current I applied to an LED.

The LED serving as a flash light source emits light varied in color temperature according to a change in current applied to the LED. FIG. 7 is an xy chromaticity diagram showing a change in color temperature relative to a change in current I applied to the LED (when the ambient temperature of the LED is 20° C.). As shown in FIG. 7, as the current I applied to the LED is reduced, the color temperature of light emitted by the LED also shifts to a lower temperature.

Therefore, when white balance correction is performed by using a constant white balance correction value on image data obtained by flash shooting, a change in current applied to the LED may result in images of different color shades.

Hence, in the digital camera 110 of the present embodiment, a white balance correction value is corrected according to a change in current applied to the LED.

As shown in FIG. 6, the electronic flash device 18 comprises the ammeter 112 for measuring current applied to the LED serving as a light source. A current value measured by the ammeter 112 is inputted to a CPU 60 via an AD converter 114.

On the other hand, an EEPROM 76 records a table indicating a correspondence relationship between a current I applied to the LED and a white balance correction value $W_I$ ($W_{IR}$, $W_{IG}$, $W_{IB}$). By making reference to the table, the white balance correction value $W_I$ ($W_{IR}$, $W_{IG}$, $W_{IB}$) is uniquely determined according to the current I applied to the LED.

The CPU 60 acquires the current I applied to the LED, via the AD converter 114 from the ammeter 112. Then, the CPU 60 determines the white balance correction value $W_I$ ($W_{IR}$, $W_{IG}$, $W_{IB}$), which corresponds to the current I, based on the table recorded in the EEPROM 76. Subsequently, the CPU 60 outputs the determined white balance correction value $W_I$ ($W_{IR}$, $W_{IG}$, $W_{IB}$) to multipliers 52R, 52G, and 52B of a white balance correction circuit 52 and performs white balance correction on taken image data.

Thus, even when current applied to the LED changes and light emitted from the LED changes in color temperature, it is always possible to obtain an image with stable color balance.

In the present embodiment, the white balance correction value $W_I$ ($W_{IR}$, $W_{IG}$, $W_{IB}$) at each current applied to the LED is recorded as a table in the EEPROM 76. A ROM 74 may record a reference white balance correction value, for example, a white balance correction value $W_{20}$ ($W_{20R}$, $W_{20G}$, $W_{20B}$) when the current I applied to the LED is 20 mA, and the EEPROM 76 may record a modification value $\Delta W_I$ (modification value of the reference white balance correction value $W_{20}$ at each current I applied to the LED) as a table at each current I applied to the LED.

In this case, the CPU 60 acquires the modification value $\Delta W_I$ corresponding to the current I applied to the LED, from the table recorded in the EEPROM 76, and the CPU 60 corrects the reference white balance correction value $W_{20}$. Then, the CPU 60 outputs the corrected white balance correction value $W_I(W_{IR}, W_{IG}, W_{IB})$ to the multipliers 52R, 52G, and 52B of the white balance correction circuit 52 and performs white balance correction on taken image data.

Further, in the method of recording a white balance correction value in the EEPROM 76, recording is performed using a communicating function and a recording medium that are provided in the digital camera, just like the digital camera 10 of Embodiment 1.

A white balance correction value corresponding to each current I may be uniquely set for all products of digital cameras. However, just like Embodiment 1, the LED emits light varied in color temperature among elements and thus it is preferable to perform setting based on the color temperature of light actually emitted from the electronic flash device 18.

As described above, according to the digital camera of the present invention, even when the LED emitting light varied in color temperature among elements is used as a flash light source, each product of camera can obtain an image of the same color shade without being varied in color balance.

Further, even when emitted light is varied in color temperature due to a change in ambient temperature and a change in current applied to the LED, it is always possible to maintain fixed color balance, achieving a stable image.

The series of embodiments discussed that the LED emitting white light is used as a flash light source. The present invention is similarly applicable to an electronic flash device which uses, as flash light sources, three LEDs including an LED emitting red light, an LED emitting green light, and an LED emitting blue light.

Moreover, in the above-described embodiments, white-balance processing is performed in the digital signal processing circuit 48. White-balance processing may be performed in an analog signal processing circuit including a CDS circuit and a gain control amplifier (not shown).

Further, white balance correction may be performed by multiplying gain values to the values of color-difference signals $C_r$ and $C_b$.

What is claimed is:

1. A digital camera having an electronic flash device using a light-emitting diode as a flash light source, comprising:
a storage device which stores correction information for correcting white balance of an image obtained by flash shooting,
a white balance correcting device which corrects white balance of the image obtained by flash shooting based on the correction information stored in the storage device,
a temperature detecting device which detects an ambient temperature of the light-emitting diode,
a modification information storage device which stores modification information for modifying the correction information stored in the storage device, the modification information storage device storing the modification information of the correction information based on a change in an ambient temperature of the light-emitting diode,
a modifying device which modifies the correction information stored in the storage device based on a detection result of the temperature detecting device and the modification information stored in the modification information storage device; and
the white balance correcting device corrects white balance of the image obtained by flash shooting based on the correction information modified by the modifying device.

2. The digital camera according to claim 1, wherein
the modification information storage device stores an ambient temperature and the modification information in association with each other, and
the modifying device determines modification information corresponding to the detected ambient temperature by referring to the association between ambient temperature and modification information stored in the modification information storage device, and modifies the correction information using the determined modification information.

3. The digital camera according to claim 1, wherein
the modification information storage device stores modification information at reference ambient temperature and modification value for the modification information depending on an ambient temperature, and
the modifying device obtains modification value in accordance with the detected ambient temperature by referring to the dependency between ambient temperature and modification value stored in the modification information storage device, modifies the modification information at reference temperature using the obtained modification value, and modifies the correction information using the modified modification information.

* * * * *